(12) United States Patent
Vacherand et al.

(10) Patent No.: US 6,724,297 B1
(45) Date of Patent: Apr. 20, 2004

(54) MULTIPLE READ METHOD AND SYSTEM FOR A SET OF TAGS BEARING DISTINCT ID CODES

(75) Inventors: François Vacherand, Le Pont de Claix (FR); Elisabeth Crochon, Poisat (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/261,967

(22) Filed: Mar. 3, 1999

(30) Foreign Application Priority Data

Mar. 12, 1998 (FR) .............................. 98 03058

(51) Int. Cl.$^7$ .............................. H04Q 5/22; G06F 12/00
(52) U.S. Cl. ...................... 340/10.3; 711/128
(58) Field of Search .................... 340/10.3, 1, 5.61, 340/5.64, 825.69, 825.72, 10.4, 10.51, 10.52, 825.02; 711/128, 118, 117, 104; 707/102; 341/79, 87, 51

(56) References Cited

U.S. PATENT DOCUMENTS 5,339,073 A * 8/1994 Dodd et al. ................ 340/5.61

5,528,221 A 6/1996 Jeuch et al.

FOREIGN PATENT DOCUMENTS

| EP | 0 696 011 | 2/1996 |
| FR | 2 677 135 | 12/1992 |

* cited by examiner

*Primary Examiner*—Michael Horabik
*Assistant Examiner*—William Bang Achon
(74) *Attorney, Agent, or Firm*—Thelen Reid & Priest, LLP

(57) ABSTRACT

A method and device for reading a set of tags, each with an ID code, of N bits, wherein the identification of these codes is carried out successively, bit by bit, by scanning a binary search tree with $$\sum_{i=1}^{N} 2^i$$

branches, each representing the value 0 or 1 of one of the N bits, each branch being connected to the branch of the complementary value 1 or 0 via a node and being read only one during a tag set read sequence.

4 Claims, 12 Drawing Sheets

FIG. 10

MULTIPLE READ METHOD AND SYSTEM FOR A SET OF TAGS BEARING DISTINCT ID CODES

FIELD OF THE INVENTION

The invention relates to a multiple read method for a static or dynamic set of tags each with an ID code and located in the electromagnetic field transmitted by a polling device. The invention also relates to a system implementing this method.

In general, the invention applies to all transactions between a polling system and answering systems (tags) the number of which is not known beforehand. In particular, the invention is applied in the field of recognizing persons bearing badges, or in the fields of counting and controlling objects bearing tags, such as luggage at an airport, goods in a store, or else products in a production line.

STATE OF THE ART

Professionals presently know numerous systems and methods for identifying tagged objects. Most of them apply to reading multiple tags, also called "multiple read".

The multiple tag read methods presently known can be grouped according to three main sorting categories: space related sorting, frequency dependent sorting and time dependent sorting.

The methods based on space related sorting are for separating the tags by modifying the volume processed by the polling device. This is done by modifying the field radiated by the polling device, using different transmission power levels and/or several transmitters.

The second sorting category is that of separating tags depending on frequency. In this case, each tag transmits, at a given frequency depending either on its code or on a band not occupied by others, or else on any other predefined criterion.

The third sorting category, i.e. time dependent sorting, is the one most frequently used in known methods. It consists in spreading the exchanges between the polling device and the tags in time and thus requires a particular protocol. This is the type of method requiring the least hardware means to be implemented. For this type of read method, two major approaches can be distinguished:

methods called "synchronous", where the interrogator is the master; and asynchronous methods, in which the tags start transmitting as soon as they enter the electromagnetic field of the polling device.

Some of the known methods provide retransmission of the tag code, after a random delay peculiar to each tag, when a collision of messages being transmitted simultaneously by the tags is detected.

There are also methods that consist in leaving a particular time slice for a tag's response. Each time slice is determined uniquely by the ID code of each tag. However, these methods do not optimize the transaction time between the polling device and the set of tags. Moreover, the time required by the method for reading all the tags can be based on the drawing of random numbers, in addition to the hazard of the number of tags present, which implies that it is not deterministic.

Among the methods of the time sorting category, there is the method described in the French patent application FR-A-2 677 135. This patent application describes a synchronous binary tree time approach.

More precisely, this patent application describes how the device makes the tags present in the polling field of the polling device supply successively each bit of their ID code until this code has been entirely identified. For this purpose, the tags respond to a control signal from the polling device; when a tag detects that the code currently being identified is different from its own, then it temporarily locks up i.e. it goes silent, so that the identification cycle continues with the other tags until there is only one unlocked tag left. The code of this tag is then identified. At the end of the identification cycle, upon a single command from the interrogator, the identified tag locks up permanently and the other tags end their temporary locking. The identification method is then reinitialized for identifying another tag. These operations are repeated as many times as required until all the tags have been identified one by one.

This method of successively identifying each code is the same as scanning through a binary search tree, each branch of which represents one of the two possible values of an ID code bit.

According to this method, the search tree is scanned completely, from the root, for identifying each code. Therefore, the same branch of the binary search tree can be scanned several times. According to this method, the polling time of the tags is consequently rather lengthy as scanning the binary tree is done from the tree root on for each of the tags. This gives a read time of N×n, considering that N is the ID code length and n the number of tags present. This method is therefore all the longer the higher the number of tags.

Furthermore, the method described in this patent application can only be applied to a static set of tags that can only be read once.

DISCLOSURE OF THE INVENTION

It is precisely the, object of the invention to remedy the disadvantages of the previously mentioned methods.

For this purpose, it provides a multiple read method for a set of static or dynamic tags, wherein it is not necessary during the polling procedure to go back to the root of the binary search tree for each ID code, which enables to reduce significantly the time required for identifying these tags. The invention also provides a system for implementing this method.

More precisely, the invention relates to a method for reading a set of tags, each with a distinct binary ID code and located in the electromagnetic field of a polling device, consisting of an identification of the binary tag codes by means of transmitting and receiving signals between the polling device and the tags. This method is characterized by the codes all having the same size N, identification of these codes being done successively, bit by bit, by scanning a binary search tree with $$\sum_{i=1}^{N} 2^i$$

branches, each branch representing the value 0 or 1 of the N bits and being connected to the branch of the complementary value 1 or 0 via a node. Each branch of the search tree is read only once during a tag set read sequence.

Thus, the method according to the invention has the advantage that it can run in a period of time $T(N,n)<N\times n$ (n being big but n being small before $2^N$). If all tags possible were present, there would be a maximum of $2^N-1$ different codes and therefore $\alpha \times 2(2^N-1)$ basic transactions for the first request, with $\alpha$ being a constant representing the ratio of the basic transaction times and which, according to the invention (and according to patent FR-A-2 672 135), is less than 2.

The polling device stores each node of the search tree and each tag stores the last node scanned during its code identification sequence.

According to an embodiment of the invention, the method consists in scanning the binary search tree, widthwise first.

According to another embodiment of the invention, this method consists in scanning the binary search tree, depthwise first.

The invention also relates to a system for reading a dynamic set of tags through a polling device, the tags and the polling device each comprising signal transmitting/receiving means as well as a storage means, characterized in that the polling device comprises:

a tag counter for counting the number of tags present in the field of the polling device;

a bit position counter;

a storage register for the list of codes read or currently being read; and a pointer for pointing to this code list, and in that each tag comprises:

a sequence number counter;

a sequence number decounter;

a tag counter;

a bit position counter; and a first read latch.

Advantageously, the polling device and the tags each comprise a tag decounter.

BRIEF DESCRIPTION OF THE FIGURES

FIG. 10 represents a sample time chart for reading the codes of four tags in the second embodiment of the invention;

DETAILED DESCRIPTION OF THE EMBODIMENT OF THE INVENTION

The invention relates to a method for identifying codes of all the tags present in the electromagnetic field of a polling device by minimizing the read time for all the codes.

This method consists in scanning, branch by branch, a binary search tree, each branch of which represents a possible value (0 or 1) of an ID code bit. In other words, the binary search tree is made up of the comprehensive description of all possible codes for the N bits making up the codes.

The tree scanning is done so that each branch of the tree is scanned only once and so that a new code is read by scanning the tree beginning with the last node found.

The method of the invention is applied to a set of tags that all have an ID code of the same size, i.e. containing the same number of bits.

According to this method, ID codes will be read successively, bit by bit, as the branches of the binary tree are scanned.

The method is based on the that when a code has been determined, the scanning for determining the other codes is resumed from the second node on where the two branches have to be scanned and which has been stored in the tag and the polling device, i.e. beginning with the branch node and not at the root, as used to be the case in prior art.

For this purpose, the method of the invention namely comprises a storage of all the nodes of the binary tree already scanned and for which the responses of the tags have shown that both branches had to be scanned during the current read sequence. This storage is done simultaneously by the polling device for the tree nodes and on board the tag for the relevant node, i.e. the last node scanned during its code read sequence.

Moreover, according to the invention, the polling device retransmits the information transmitted by the tags at each identification step which enables them, on the one hand, to synchronize their transmissions, and on the other hand, to manage the binary tree scanning as well as their transmissions depending on their codes. Advantageously, this also allows to find out about the code of the other tags present in the electromagnetic field and to find out about the number of tags present in this electromagnetic field.

Thus, this inventive method not only allows to read the set of tags present in the electromagnetic field for a static set of tags, but also allows to identify all tags entering or leaving in the case of a dynamic set of tags. In other words, this method allows to detect and identify a tag entering the electromagnetic field, when the identification sequence has started. For this purpose, a tag that enters the electromagnetic field of the polling device during the multiple read cycle remains silent until the next cycle. In parallel, the method allows a tag leaving the electromagnetic field of the polling device during the multiple read cycle not to be taken into account. In this case, the polling device detects an "error".

Figure 1:
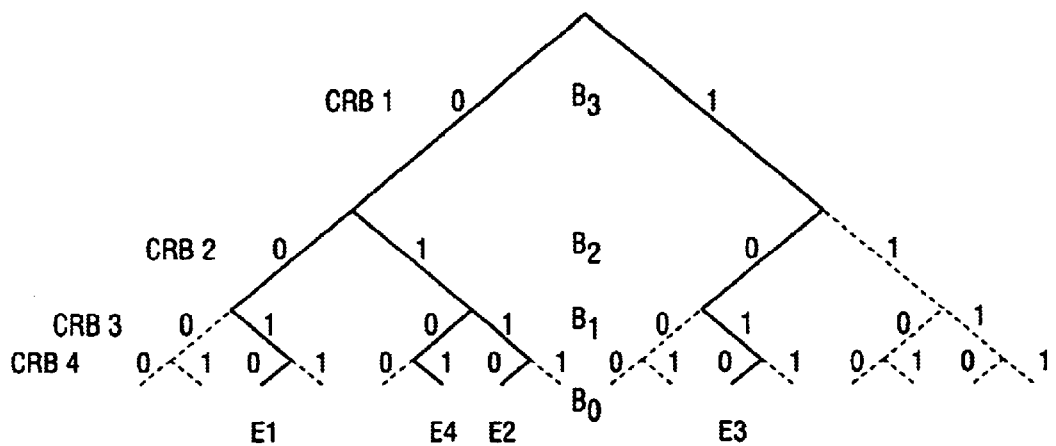
FIG. 1 represents a sample binary search tree for four tags E1, E2, E3, E4.

FIG. 1 represents a binary search tree for an example in which it is tried to determine the ID codes of four tags. For this example, the tag codes each have four bits (N=4) and are as follows:

tag 1 (E1) has code 0010;

tag 2 (E2) has code 0110;

tag 3 (E3) has code 1010;

tag 4 (E4) has code 0101;

In this FIG. 1, the most significant bit is called B3, the following bits B2 and B1 and the least significant bit B0.

As it appears in this FIG. 1, the search tree is built by starting with the most significant bit, i.e. bit B3, then by breaking down the codes up to the least significant bit, i.e. bit B0.

In this FIG. 1, all possible branches of the search tree are represented by dotted lines and branches actually scanned during the ID code search are represented as solid lines.

The values 0 and 1 assigned to each of the branches stand for the value of the bit represented by said branch.

Thus, the scanning in solid lines located leftmost in the figure allows to retrieve the code of tag E1 then the one located immediately to the right, the code of tag E4, next that of tag E2 and finally that of tag E3.

Briefly, the scanning followed for determining the odes of these four tags is as follows. First of all, it is checked whether at least one of the tags has a most significant bit B3 set to value 0; three tags (tags E1, E4 and E2) respond that their bit B3 is 0. The code of these three tags therefore starts with 0.

The method thus continues from branch to branch and returns to the last branch node each time a read sequence of another code is undertaken.

The inventive method that has just been described briefly is implemented by a tags/reader (or polling device) system.

Figure 2:
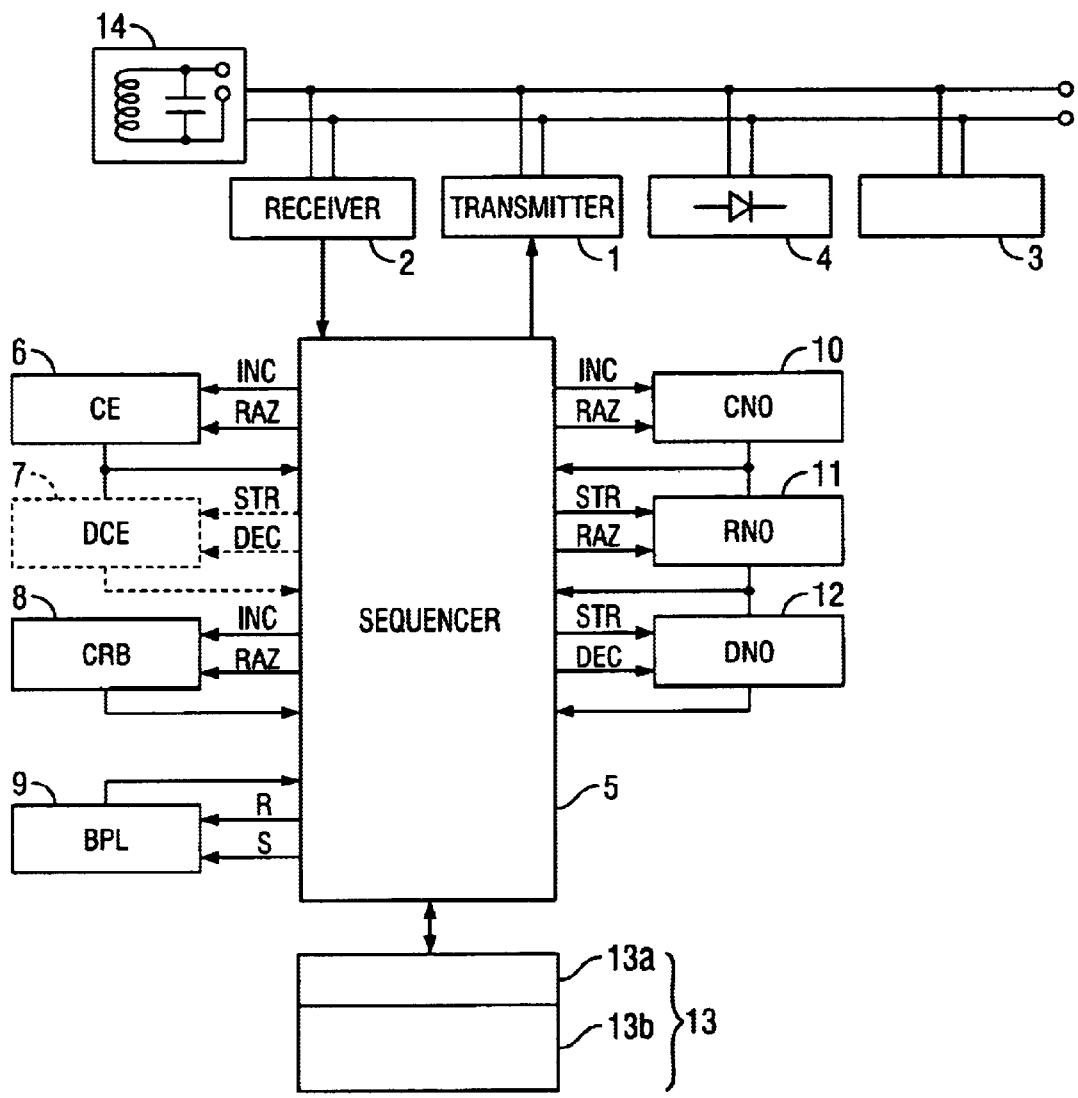
FIG. 2 schematically represents the architecture of a tag.

In FIG. 2, the architecture of a tag is represented schematically. Each tag has an electronic transmission means (14) as well as electronic modulation (1) and demodulation (2) means enabling it to communicate binary information to the polling device, or else to receive binary information from this polling device. Moreover, each tag can comprise an electronic power saving means (4), as well as an electronic clock extraction means (3).

These means 1, 2, 3, 4 and 14 are known and described in the patent application FR-A-2 677 135; therefore, they are not going to be described in further detail in the present application.

Further, each tag comprises an electronic means (5) enabling it to sequence a series of actions to be taken depending on messages received from the polling device, as well as a temporary or permanent information storage means. This information storage means (13) is arranged into two areas: one storage zone (13a), write-protected and reserved for storing the ID code, and one backup area (13b) for variable information.

Various modules are connected to the sequencing means, called "sequencer". One of these modules is the tag counter CE, referenced as 6, and that has the function to allow counting the total number of tags present during the read sequence. During the current search sequence (or identification sequence) it allows staying at a bit position as many times as there are tags present. Its value changes in the same way for each tag, as well as for the polling device.

Another module connected to sequencer 5 is the bit position counter CRB, referenced as 8. This counter indicates on the tags which is the weight or position of the bit currently being read on the tags. It increments at each beginning of a bit position read cycle.

Also connected to this sequencer is a first read latch BPL, referenced as 9, that is to lock the tag when the code of the latter has been determined entirely. This latch BPL is initialized to 0, then set to 1 at the end of the first correct ID code read of the tag to which it belongs. This enables the tag, still present in the interrogator's field, but already read, not to respond any more to a multiple read request, but to respond to a presence verification request using its sequence number according to a method described in the patent application filed today by the applicant and titled "method and system for reading a dynamic set of tags bearing distinct ID codes".

A sequence number counter CNO, referenced as 10, is also connected to sequencer 5. This counter CNO increments each time a new higher order code appears, i.e. each time at least one tag responds present at each of the two junction branches of a binary tree node (receipt of code 11, as explained below). This is the case provided the tag has not yet been polled for the bit number or else has just replied by indicating a bit set to 0. This sequence number counter CNO is initialized to 0 at the beginning of the sequence.

It should be noted that the numbering method, as it has just been described, permits to sort the ID codes of decreasing weight by ascending sequence number.

A sequence number register RNO, referenced as 11, is also connected to sequencer 5. This sequence number register RNO allows to save in memory the sequence number of the tag as calculated during the read sequence. This sequence number enables a faster transaction between the tag and the polling device during the rest of the method and, in particular, during the verification sequence. This counter CNO is set to 0 when the tag is initialized or in case of a code read error from the polling device.

A sequence number decounter DNO, or width sequence decounter, referenced as 12, is also connected to this sequencer 5. Decounter 12 is decremented during the bit position search sequence, as many times as there are tags being identified. Decounter 12 is determined at the value of the sequence number counter, at each beginning of a scan cycle (or read cycle) of a new bit position. When its value reaches 1, the tag understands that it is its turn to transmit the weight of the current bit position of its ID code. Decounter DNO remains at 0 until the end of the bit position scan cycle.

Also connected to this sequencer is a storage means 13, arranged into a write-protected storage zone 13a, reserved for the ID code, and a variable information backup area 13a.

In the first embodiment of the invention, that will be described later, the tag also comprises a tag decounter DCE, referenced as 7. By decrementing, this decounter DCE allows to find out which code the sequence is reading. When it reaches the value 0, this means that the bit position has been entirely scanned. Then it is possible to proceed to the next bit position by incrementing bit position counter 8. This tag decounter 7 is initialized at the value of tag counter 6 at the beginning of a sequence concerning a bit position.

This decounter DCE, just like decounter DNO, receives a decrement instruction DEC and a storage instruction STR from sequencer 5. On the contrary, the counters CE, CRB and CNO receive a reset to zero instruction RAZ and an increment instruction INC. As for register RNO, it receives a storage instruction STR and a reset to zero instruction RAZ, and latch BPL receives reset to zero R and reset to one S instructions. Each module 6 to 12 returns its current value to sequencer 5.

Figure 3:
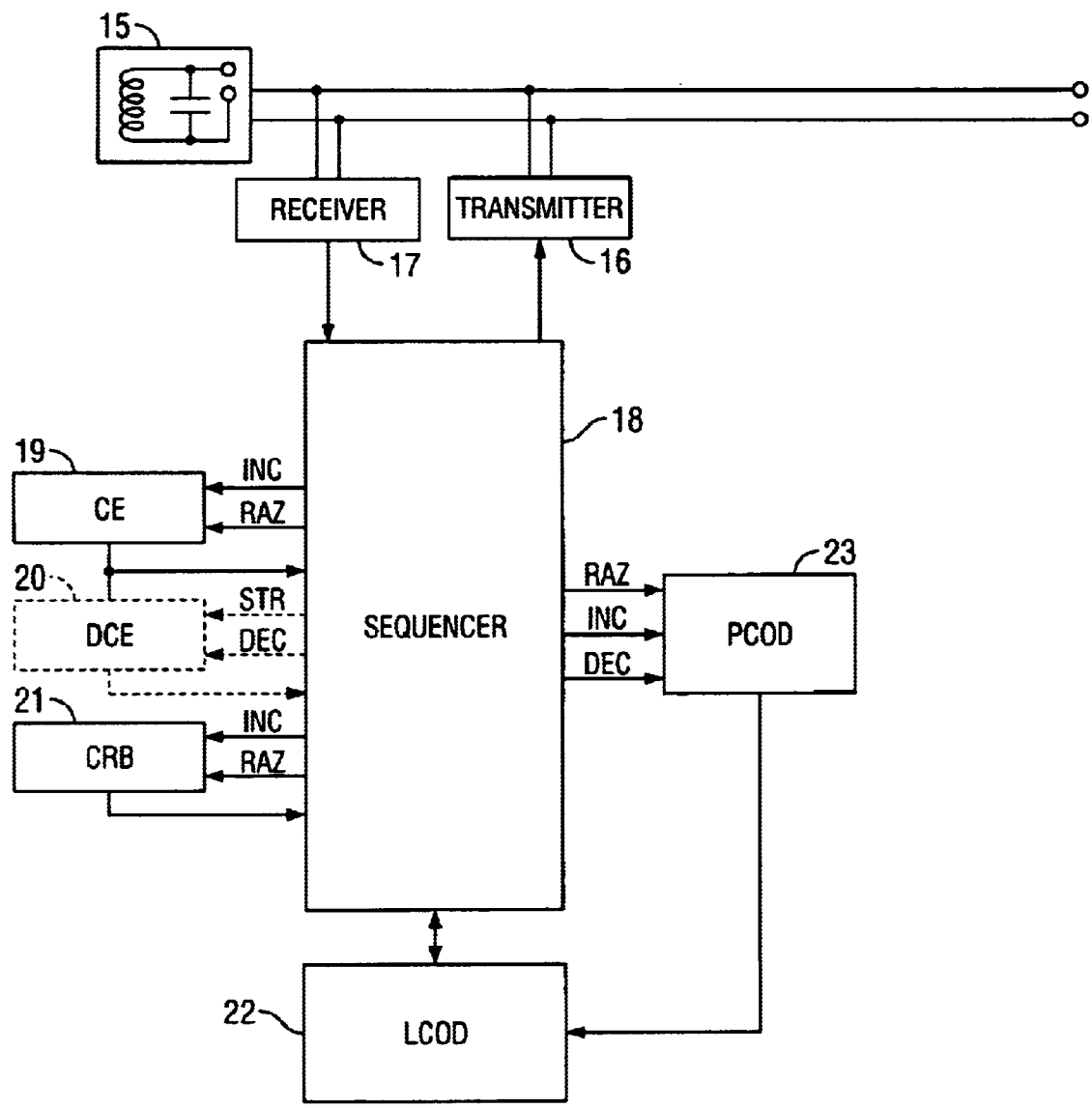
FIG. 3 schematically represents the architecture of the polling device.

In FIG. 3, the architecture of a polling device as used by the invention is represented schematically. This polling device comprises an electromagnetic transmission means, referenced as 15, as well as electronic modulation 16 and demodulation 17 means enabling it to communicate binary information to the set of tags, or else to receive binary information therefrom.

Furthermore, this polling device comprises an electronic means 18 (called sequencer) enabling it to sequence a series of actions to be taken depending on the messages received from the tags. Furthermore, it comprises a temporary or permanent information storage means 22.

As it appears in FIG. 3, sequencer 18 exchanges information with a plurality of modules. Among these modules, there is a tag counter CE 19 and a bit position counter CRB 21 which have similar functions as those of the analogous tag modules (FIG. 2). Therefore, they are not described in further detail with reference to this FIG. 3.

Just like the tags, the polling device can also comprise a tag decounter DCE 20, used only in the first embodiment of the invention that will be described later.

The information storage means 22 namely comprises a list LCOD with codes currently being read or already read. More precisely, this list of codes currently being read or already read is a memory zone where the polling device sorts and arranges the codes currently being read or already read. This arrangement is dynamic, in as far as a tag may at any time go out of or into the interrogator's field. It is therefore possible to insert or delete elements (i.e. codes) from this list. A list pointer PCOD, referenced as 23, enables pointing the element currently processed in this list.

The tags/reader system that has just been described implements a method for reading multiple tags with minimum binary tree scanning time.

Figure 4:
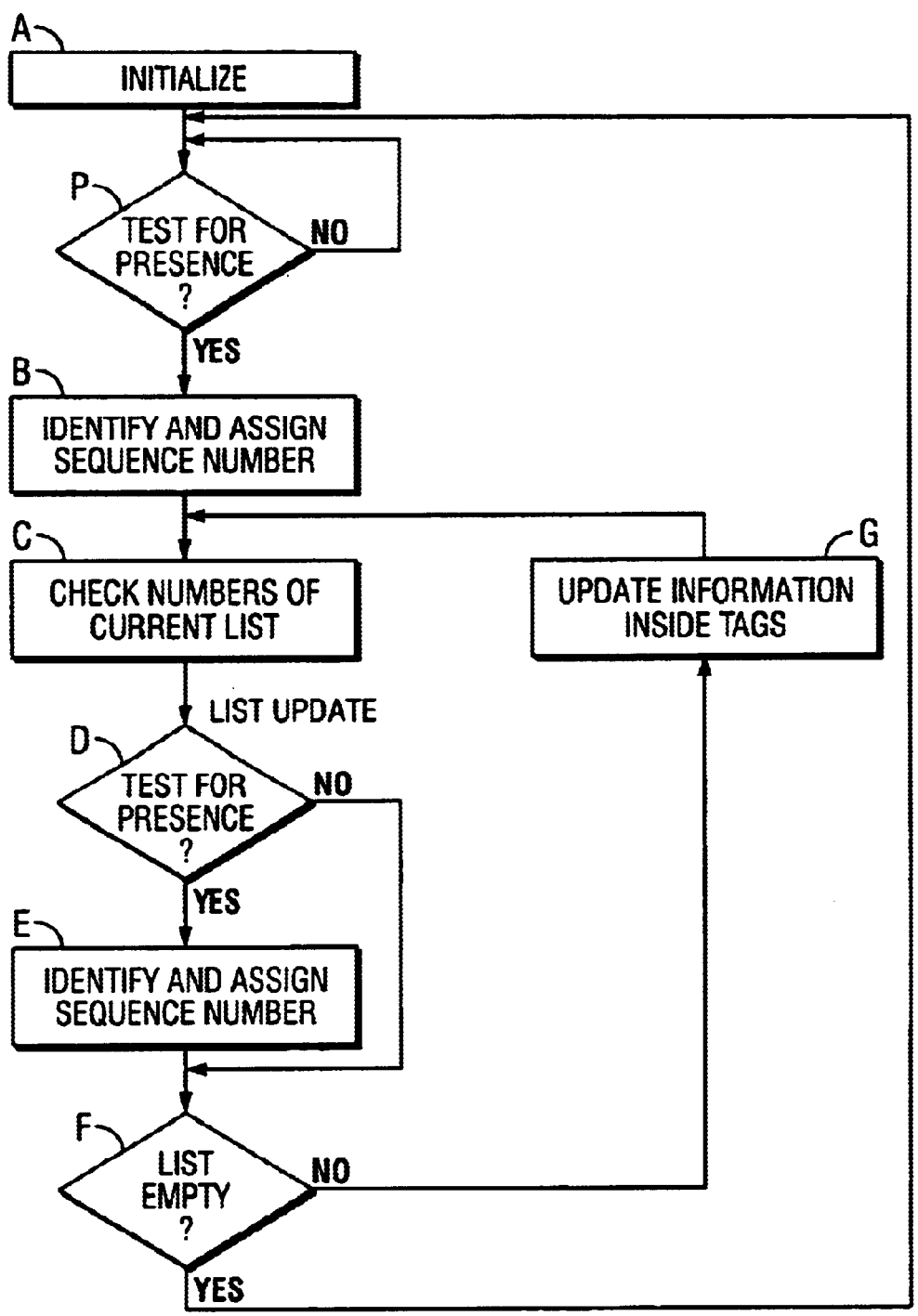
FIG. 4 represents the general block diagram of the tag polling.

FIG. 4 represents the main steps of this method.

Generally speaking, this method comprises a first initialization step, referenced as A, followed by a test for presence P which, if positive, proceeds to a tag identification step B with assignment of a sequence number; if the result of test P is negative, the system loops back to step P until the arrival of at least one tag. The method then proceeds with a step C for verifying the current numbers of the list and managing the sequence numbers taking into account possible tag departures; a test D then consists in checking for the presence of at least one new tag in the field of the device.

If this test for presence D is true, then the method proceeds with an identification phase E with assignment of a sequence number, then a test F consisting in checking whether the list is empty.

If the test for presence D produces a negative outcome, then the method directly proceeds to test F for verifying the empty list.

If this list is empty, then the method continues at the beginning of step B where it goes into standby waiting for new tags. On the contrary, if it is not empty, a step G for updating the information in the tag is carried out.

The basic protocol of the method from the bit point of view resides at search tree node level. The information exchange at bit level will be explained starting with the sequence represented in FIG. 4. This sequence can be executed in four clock cycles T1, T2, T3, T4:

T1, which is the cycle wherein a signal is transmitted by the tags whose bit currently being scanned is 1;

T2, which is the cycle wherein a signal is transmitted by the tags whose bit currently being scanned is 0;

T3, T4 are cycles wherein the polling device retransmits a code indicating the binary doublet received during cycles T1 and T2, namely code 00, code 01, code 10, and code 11.

It should be noted that an active tag is a tag whose starting code corresponds to the currently scanned node. On the one hand, this allows to read the ID code bits of each active tag, on the other hand, to clock the read and also broadcast to all the tags the same information concerning the possible presence of both branches of the node currently being scanned. Thus, the polling device and all the tags have the same information and can therefore potentially carry out the same computations.

Figure 5:
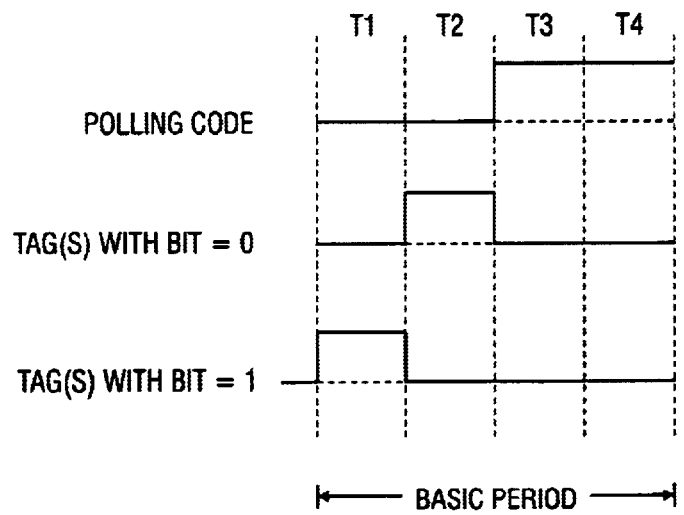
FIG. 5 represents a basic time chart for reading a node, extracted from an identification segment.

FIG. 5 therefore represents the basic time chart for reading a node with cycles T1, T2, T3 and T4 which stand for a basic period; each line of the time chart stands for a different signal: the first line stands for the polling code signal; the second line stands for the signal from one or several tags having a bit set to 1 and the third line stands for the signal from one or several tags having a bit set to 0.

The polling code, called "code x, y" in the example represented in this figure, contains at least two bits x, y corresponding to the information received during the slots T1 and T2. In other words:

code xy=x during T1, and
y during T2
x=1 if a bit set to 1 is present during T1, otherwise 0,
y=1 if a bit set to 0 is present during T2, otherwise 0.

This produces four possible codes: code 00, code 10, code 01, and code 11.

According to the invention, the scanning of the binary tree can be done according to two different modes, i.e. through a widthwise scan first, or through a depthwise scan first.

According to the first embodiment, the binary search tree, made up of the comprehensive description of all possible codes, is scanned widthwise first. The codes are therefore read simultaneously, code by code, in descending order for one given bit position. They are also read bit by bit until the least significant bits have been found.

The steps describing the inventive method according to this embodiment comprise two nested loops in the search sequence: a first loop indexed on the bit position and a second loop indexed on the number of tags listed at a given time. Of course, this number is not known at the beginning of the read sequence; it changes as the tree search scanning moves along, each time at least two tags are present at a binary junction, i.e. at a node.

This embodiment is implemented by means of the system represented in FIGS. 2 and 3 in the embodiment where the reader and the tags each comprise a tag decounter DCE.

The basic principle of this embodiment resides in the polling device clocking and rebroadcasting to all tags the messages received at the time the previous code was read. Thus, each tag, informed of the transmissions of the group of tags present, has the means to analyze the present situation: it can find out when it is supposed to transmit: it can also count the other tags.

Each tag thus has all the information for reading all the codes present, if this turns out to be necessary, for a particular application. In this case, the tag applies the same algorithm as that of the polling device.

The search sequence starts with a beginning of sequence message, sent by the polling device and finishes with an end of sequence message. It essentially comprises two phases. A first phase for scanning (or reading) the codes present, then a second phase for validating the codes received.

According to this method, the code identification phase is carried out by scanning the binary search tree from node to node, according to the code parts (most significant bits) already identified. The first bit following the part already identified of the code currently being identified is read at the next node. At each step corresponding to a binary node, two time slots are reserved so that a tag whose code starts with the arborescence leading from the root to this node can reply. This tag responds during the first slot if the following bit is set to 1, or during the second slot if the following bit is set to 0.

The polling device clocks the sequence by returning a two bit code, indicating the bits read: code 01 for no bit set to 1, but 1 bit set to 0, etc.

Thus, two tags with different codes at this bit position can each respond within one of the two slots. Then, the presence of at least one new tag is detected.

It should be noted that the part already read of a code currently being read could correspond to the beginning of several codes. By looping back to the fixed index corresponding to the number of ID code bits, as well as to the incremental index of the number of tags detected up to then, all tags present can be read.

At the end of the read phase, the polling device scans the set of tags by confirming or invalidating the correct read of their respective ID code. This is the code verification phase; it is based on using sequence numbers assigned to each tag; the role of these sequence numbers as well as the method of assigning these numbers are described in the patent application titled "method and system for reading a dynamic set of tags bearing distinct ID codes", already mentioned.

In view of indicating that it has been read correctly for the first time and that its sequence number is correct, the tag returns an acknowledgement. Its first read bit is then validated. On the contrary, in case of an incorrect code read, the polling device sends an error message and the tag goes back to waiting for another first read.

If the tag enters the field of the polling device during the read sequence, it must wait for the next beginning of sequence message before it can answer. It does not disturb, and is not disturbed by the current dialog between the polling device and the other tags.

If a tag goes out of the interrogator's field during the identification sequence, then the reading of the next bit returns no answer of a next bit set to 1 or 0, except if another tag present has the same starting code. In the first case, the interrogator sends a message like code00 which launches a decrement of the sequence number counters of each tag that has not yet been read during the corresponding scan sequence at the current bit position. The tag counter of each of the tags is also decremented, as well as the tag counter of the polling device; the polling device then deletes the code from its list.

Figure 6A:
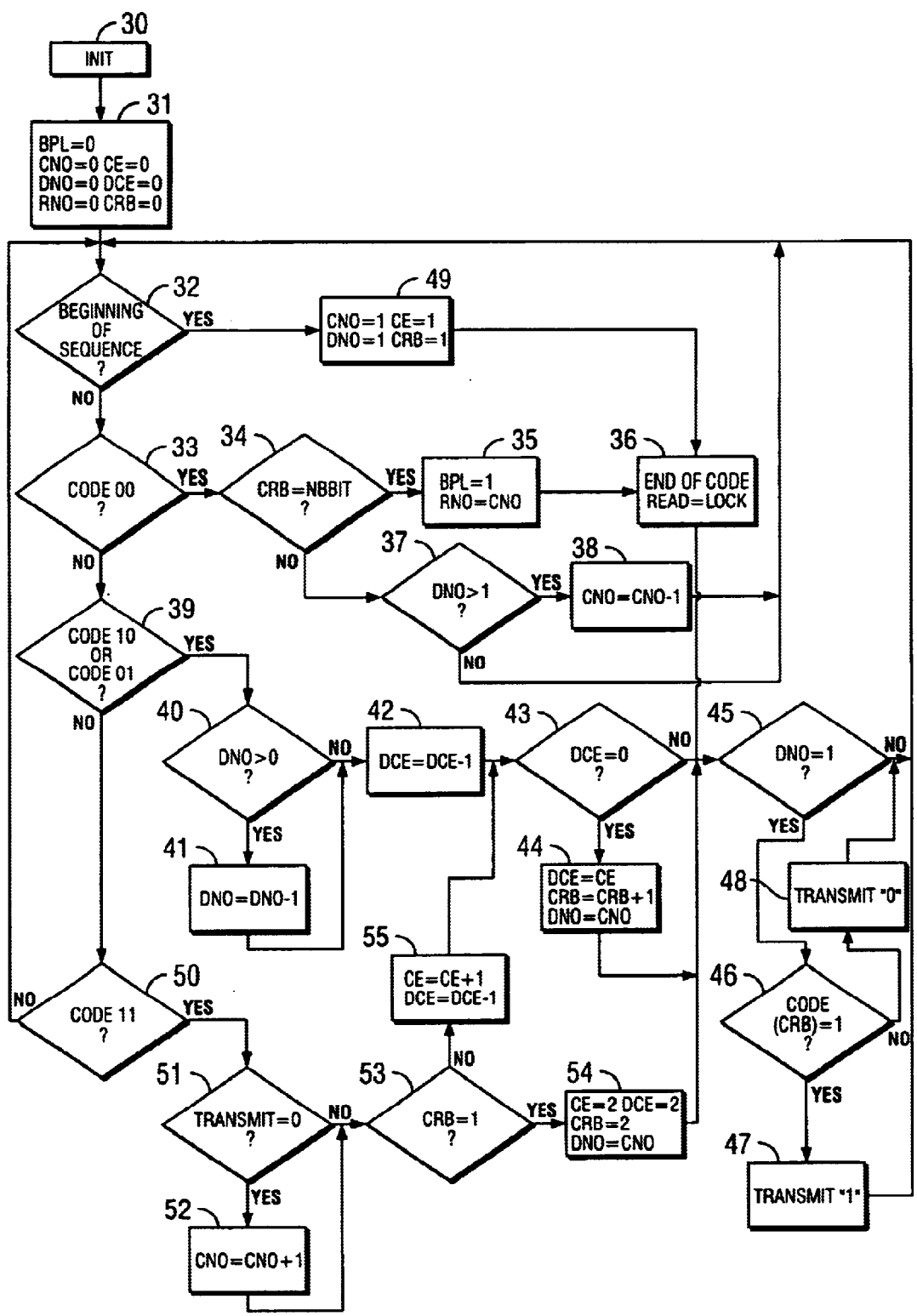
FIGS. 6A and 6B represent the respective block diagrams of the code read phase and the code verification phase for a tag, in the first embodiment of the invention.
Figure 6B:
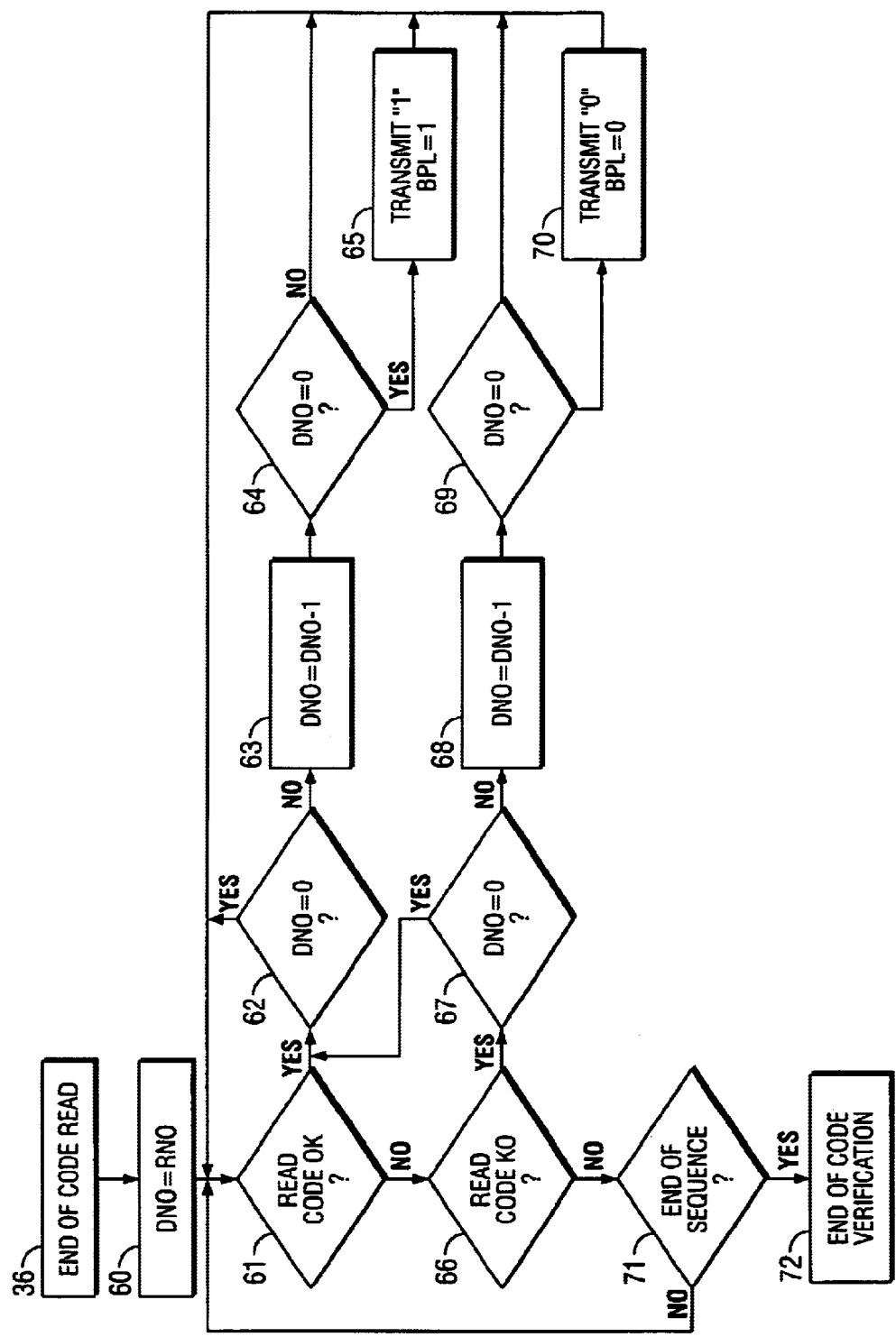
Figure 7A:
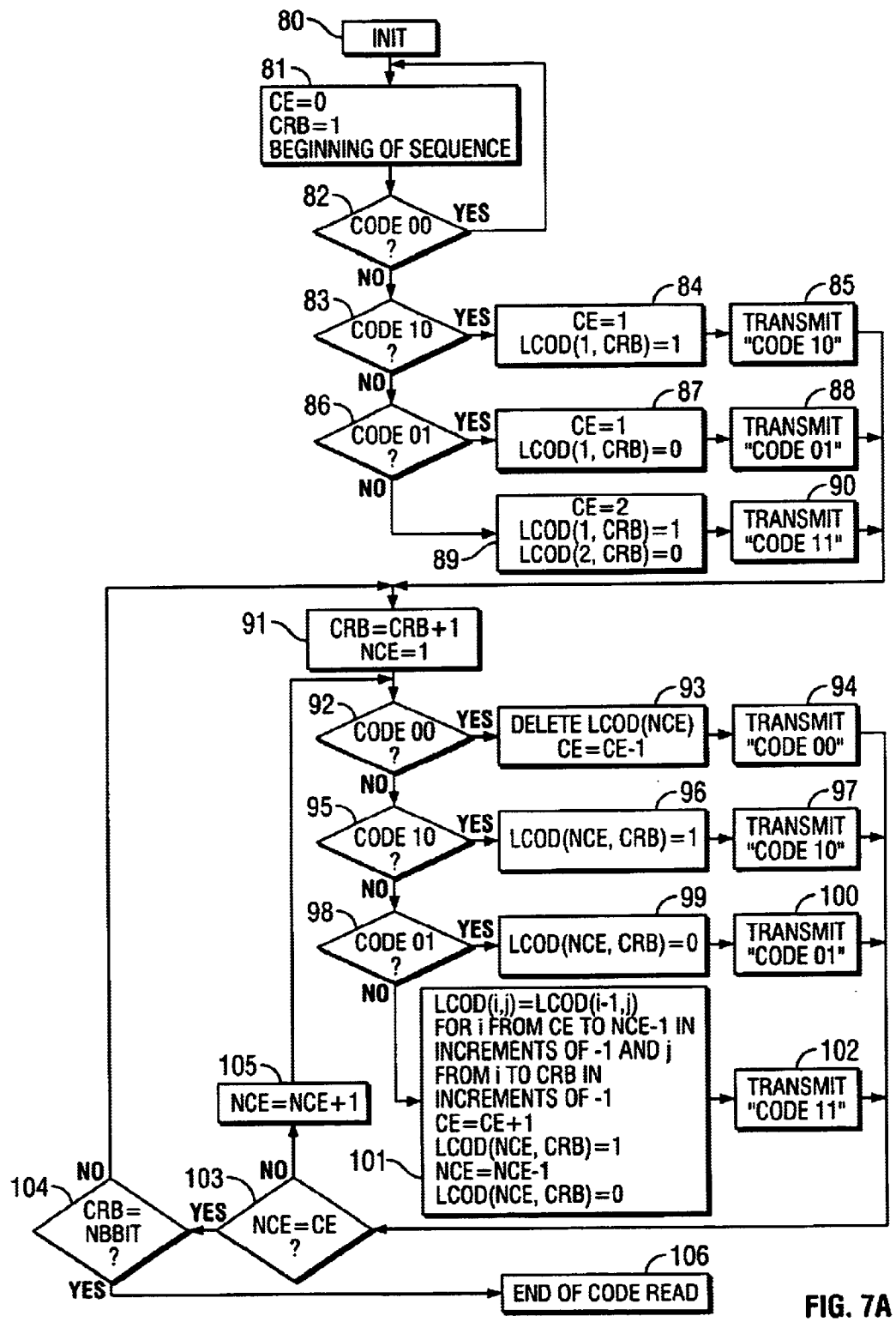
FIGS. 7A and 7B represent the respective block diagrams of the code read phase and the code verification phase for the polling device, in the first embodiment of the invention.
Figure 7B:
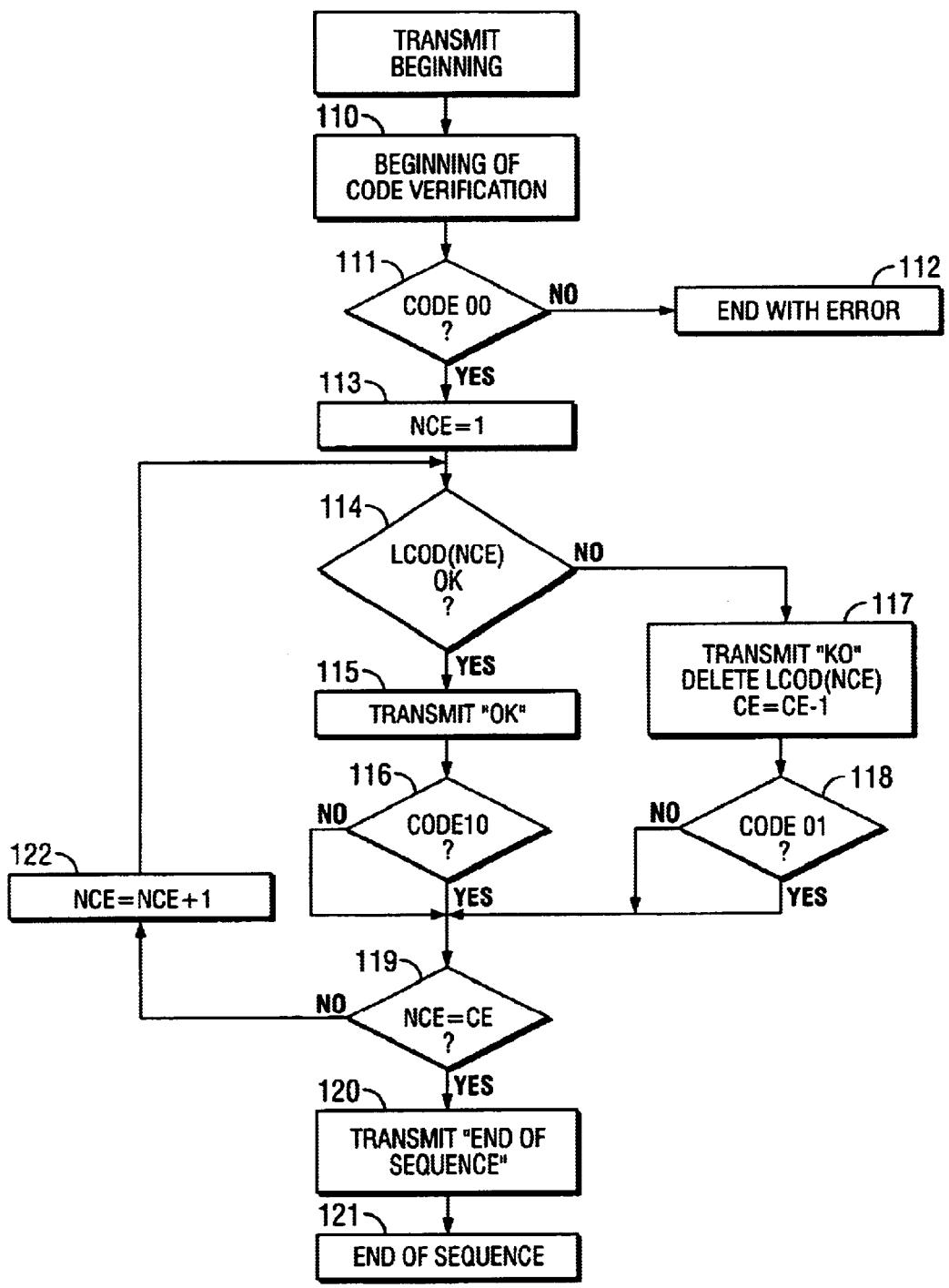

This search sequence will be described in further detail with reference to FIGS. 6A and 6B, 7A and 7B. In particular, FIGS. 6A and 7A represent the block diagrams of the phase for identifying the codes present and FIGS. 6B and 7B represent the block diagrams of the phase for validating the codes received.

During the identification phase, the polling device can use and transmit eight different codes. They are:

codedebutsequence: this code permits to initialize all the tags;

code00, code10, code01, code11: these codes permits to inform the tags of the progress of the search tree scanning;

codeOK: this code tells the tag whose code read has just finished that said code is valid. The tag then locks up;

codeKO: this code is provided for invalidating a code read, in case of error, and for placing the tag back in standby for a subsequent read cycle;

code fin sequence: this code freezes the status of the various counters, decounters and latches until the next cycle.

The block diagram, as seen by the tag, of this read phase according to the first embodiment is represented in FIG. 6A.

This method comprises a first initialization step 30, next a step 31 for resetting to 0 the first read latch BPL, the sequence number counter CNO, the tag counter CE, the sequence number decounter DNO, the tag decounter DCE, the sequence number register RNO and the bit position counter CRB. When these initializations have been done, the method proceeds with a test 32 that consists in checking whether this is the beginning of the sequence; should this be the case, then the sequence number counter CNO is set to 1, the sequence number decounter DNO to 1, the tag counter CE to 1 and the bit position counter CRB to 1 (block 49).

Next, the method proceeds with a test 45, that consists in checking whether the sequence number decounter DNO is 1. Should this be the case, then a test 46 checks whether the code bit is 1. If so, the tag transmits "1" in step 47 and returns to the beginning of test 32; if not, the tag transmits "0" and the method continues at the beginning of test 32.

Also, if test 45 results in DNO not being equal to 1, then the method continues at the beginning of test 32.

In case this is not the beginning of the sequence (test 32), then a test 33 consists in checking whether the code sent by the interrogator is code00. Should this be the case, then it is checked, in 34, whether the bit position counter CRB is equal to the number of current bits (NBBIT): if so, then the first read latch is set to 1 and the sequence number register RNO is set to the value of the sequence number counter CNO, at block 35; the tag involved is then locked until the end of the sequence (block 36); if not, then the method proceeds with a test 37 that consists in checking whether the sequence number decounter DNO is greater than 1 and, if so, the sequence number counter CNO is decremented by 1, then returns to the beginning of test 32; and if not, the method directly returns to the beginning of test 32.

If in test 33, it turns out that this is not code00, then a test 39 is carried out for checking whether it is code10 or code01. Should this be the case, then it is checked (test 40) whether the sequence number decounter DNO is greater than 0; if so, this decounter DNO is decremented by 1 (block 41), next, the method proceeds to block 42; in case DNO is not greater than 0, the method directly goes to step 42 where the tag decounter DCE is decremented by 1.

A test 43 consists then in checking whether this tag decounter DCE is equal to 0; if so, the tag decounter DCE is set to the value of tag counter CE, the bit position counter CRB is incremented by 1 and the sequence number decounter DNO is set to the value of the sequence number counter CNO (block 44).

After step 44 and if the answer to test 43 is negative, the method proceeds with test 45, described before.

If in test 39 neither code01 nor code10 is found, then it is checked whether it is code11 (test50). Should this not be the case, the method continues at the beginning of test 32. Should this be the case, then the method proceeds with a test 51 that consists in checking whether the tag has transmitted "0": if so, the sequence number counter CNO is incremented by 1, in step 52. After step 52, and if no "0" was transmitted during test 51, then the method proceeds with a test 53 that consists in checking whether the bit position counter CRB is equal to 1. Should this be the case, then the tag counter CE, the tag decounter DCE and the sequence number counter CRB are set to, 2 and the sequence number decounter DNO is set to the same value as the sequence number counter CNO (block 54). The method then proceeds with test 45 already described.

If in test 53 it turns out that CRB is not equal to 1, then the tag counter CE is incremented by 1 and the tag decounter DCE is decremented by 1 (block 55); the method then proceeds with test 43, already described.

In FIG. 6B, the block diagram of the code verification phase is represented schematically, according to the first embodiment, as seen by the tag. For this code verification phase, the method starts at the end of code read block 36, described in FIG. 6A.

When the end of code read is detected, i.e. when the tag has been locked, then the sequence number decounter DNO is set to the value of the sequence number register RNO (block 60).

A test 61 then consists in checking whether the interrogator has transmitted codeOK. Should this be the case, then a test 62 checks whether the sequence number decounter DNO is 0; in this case, the method continues at the beginning of test 61; otherwise, the sequence number decounter DNO is decremented by 1, at block 63, then a test 64 checks whether the new value of the sequence number decounter DNO is 0: if so, the tag transmits "1" at block 65, and the first read latch BPL is set to 1; if not, the method continues at the beginning of test 61.

If the answer to test 61 is negative, then a test 66 consists in checking whether the interrogator has transmitted codeKO. Should this be the case, it is then checked (test 67) whether the sequence number decounter DNO is 0; if so, the method continues at the beginning of test 62; if not, the sequence number decounter DNO is decremented by 1 (block 68), then a test 69 checks whether the new value of the sequence number decounter is 0. Should this be the case, then the tag transmits "0" and the first read latch BPL is set to 0 (block 70), then the method continues at the beginning of test 61. Should this not be the case, the method continues directly with test 61.

If no codeOK or codeKO is read, then a test 71 consists in checking whether this is the end of the sequence; in this case, it is considered that the code verification phase is finished (block 72); otherwise, the method continues at the beginning of test 61.

FIG. 7A represents the block diagram of the inventive method executed by the polling device for the code read phase.

This method starts with a polling device initialization step 80. It proceeds with a step 81 for setting the tag counter CE to 0, setting the bit position counter CRB to 1 and sending a beginning of sequence message.

It should be noted that LCOD is a code list at NBBIT; LCOD (NCE, CRB) corresponds to bit # CRB of the code of tag # NCE (current number of the tag), with NCE=1 and CRB=1 in step 84; LCOD (NCE) corresponds to the code of tag # NCE.

A test 82 then checks whether code00 has been received. Should this be the case, then the method continues at the beginning of step 81. Otherwise, the method proceeds to test 83 that checks whether this is code10: if so, the tag counter CE is set to 1 and bit 1 of the first code is set to 1 (block 84). [(LCOD(C1, CRB) with CRB=1, CRB being the bit number of the code of tag # NCE (current number of the tag)]. The method then proceeds with a code10 transmission step 85, then with step 91 that will be described later.

If in test 83, this is not code10, then the polling device checks, in test 86, whether it is code01. Should this be the case, then the tag counter CE is set to 1 and bit 1 of the first code is set to 0, in step 87, then a code10 is transmitted in step 88; the method then proceeds to step 91. If in test 86 the code received is not code01, this then implies that there is at least one tag with a bit set to 0 and at least one with a bit set to 1 (code 11); then, the list is initialized with a tag set to 1 for the first bit and a tag set to 0 for the first bit and the tag counter CE is set to 2. A code 11 is then transmitted in step 90.

Codexy does not have the same physical meaning in the case of tests 82, 83, 86 as during message transmissions 85, 88, 90, but has the same functional meaning. In fact, codexy of tests 82, 83, 86 is the synthesis of the information transmitted by the tags during periods T1 and T2 of the basic read cycle described in FIG. 5, and corresponds to a status:

x=0 indicates the absence of tags with a bit set to 1, and
x=1 the presence of a tag with a bit set to 1;
also:
y=0 indicates the absence of tags with a bit set to 0, and
y=1 the presence of a bit set to 0.

On the other hand, code xy of transmissions 85, 88, 90 corresponds to the message sent by the interrogator according to the bit value of the tags currently being scanned.

Then step 91 consists in incrementing the bit position counter CRB and in setting the current tag number NCE to 1. Tests 92, 95, 98, which are respectively the same as tests 82, 83 and 86, consist in checking whether this is code00, code10 or code01. If test 92 is true, step 93 consists in deleting the code of the current tag # NCE from the list LCOD and decrementing the tag counter CE. Transmitting code00 is then carried out in step 94.

If test 92 is not true, a test 95 is implemented. If the answer to this test is positive, i.e. there is at least one tag with the current bit set to "1" and none with this bit being set to "0", the current bit (CRB) of tag # NCE is set to 1 in the list LCOD (block 96), then a code10 message is transmitted in block 97.

If the answer to test 95 is negative, the method proceeds with a test 98 that consists in checking whether this is code01, i.e. if there is at least one tag with the current bit set to "0" and none with this bit being set to "1"; should this be the case, the current bit (CRB) of tag # NCE is set to "0" in the code list LCOD, in step 99, then a code01 transmission takes place in step 100.

If the answer to test 98 is negative, i.e. if there is at the same time at least one tag with bit CRB set to "1" and at least one with this bit being set to "0", then the tag counter CE is incremented, the current bit CRB of tag NCE is set to 1 in the list LCOD, NCE is incremented and the current bit CRB of tag NCE is set to 0 in the list LCOD when the beginning of the code has been duplicated with the preceding tag code (NCE−1). Next, code11 is transmitted in step 102.

At the exit of each of steps 94, 97, 100 and 102, the method proceeds with a NCE verification test 103. If NCE is not equal to CE, then NCE is incremented by 1, in step 105, then the method continues with test 92. If this NCE is equal to the tag counter CE, then a new test 104 is carried out to check whether the bit position counter CRB is equal to the number of ID code bits NBBIT: if so, the read sequence is finished (block 106); if not, the method continues with step 91.

In FIG. 7B, the block diagram of the code verification phase has been represented for the polling device.

This code verification method starts with a step 110 announcing the beginning of the code verification, "transmission start".

Subsequently, a test 111 consists in checking whether this is code00; should this not be the case, an end of sequence message with an error is transmitted in step 112. If this actually is code00, then NCE is set to 1, in step 113.

A test 114 then consists in checking whether the code that has just been read is correct. Should this be the case, then a code "OK" is transmitted (step 115). A test 116 is then carried out for checking whether this is code10. Whatever the case, the method proceeds to step 119 that will be described later.

If the answer to test 114 is negative, then a message "codeKO" is transmitted in step 117, code LCOD(NCE) is deleted from the list and the tag counter CE is decremented. A test 118 then checks whether it is code 01 and, whatever the outcome of this test, the method proceeds with a test 119. The latter consists in checking whether NCE is equal to tag counter CE. Should this be the case, then an end of sequence message (in step 120) is transmitted and the sequence is considered finished, in step 121. If test 119 produces a negative answer, then NCE is incremented by 1 in step 122 and the method continues at the beginning of test 114.

Figure 8:
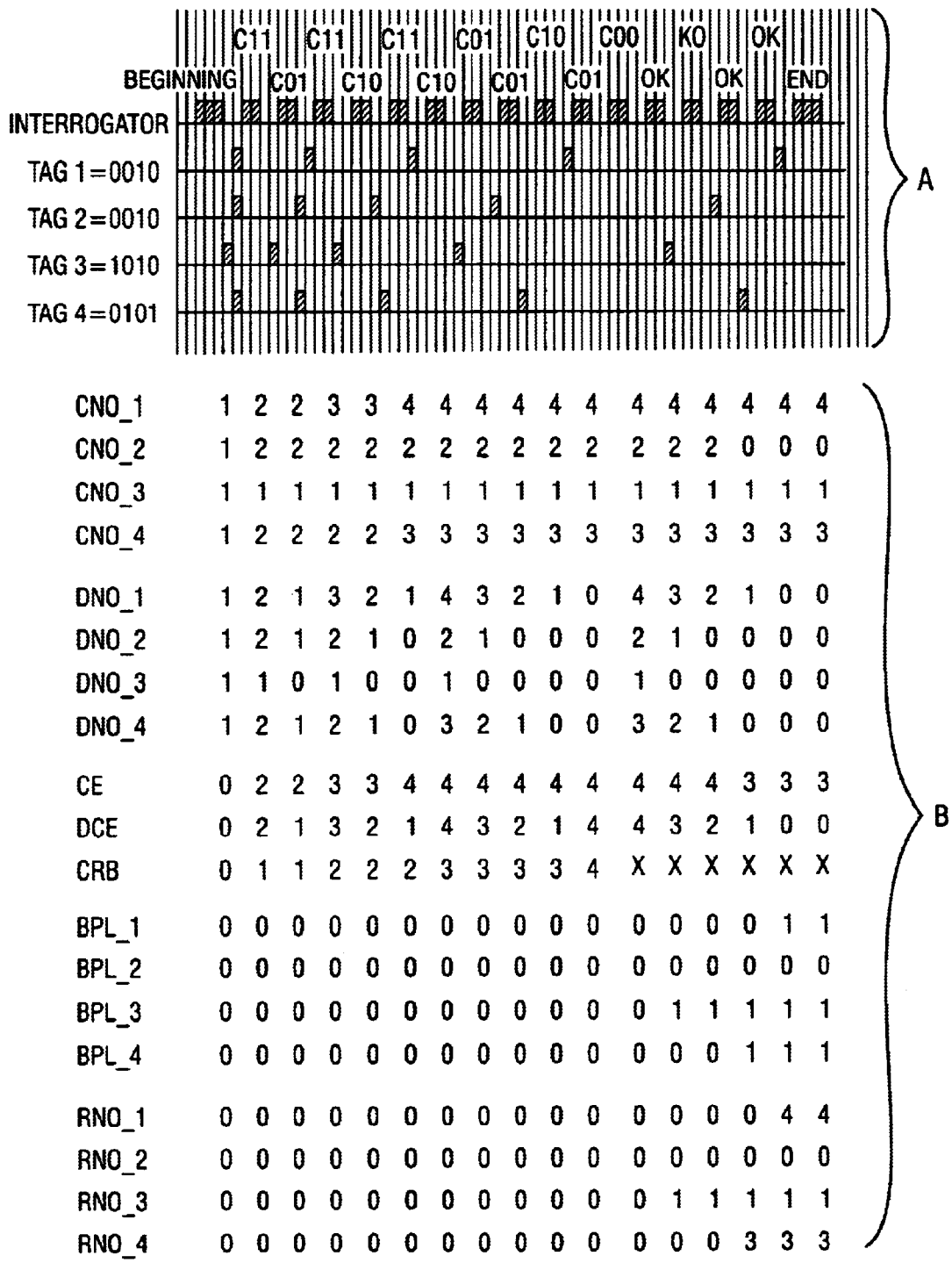
FIG. 8 represents a sample time chart for reading the codes of four tags in the first embodiment of the invention.

In FIG. 8, the time chart for searching the codes of four tags E1, E2, E3 and E4 corresponding to the example given in FIG. 1 is represented. This time chart explains the information exchanged during the multiple read sequence and indicates the values of the different registers and counters during this sequence.

In part A of this FIG. 8, it appears that according to the first embodiment of the method, i.e. when the tree is scanned widthwise first, the most significant bit of each tag is detected first, then the second most significant bit, etc. so that the tag codes are all determined at the end of the read sequence.

In part B of this FIG. 8, the values of the sequence number counter CNO, the values of the sequence number decounter DNO, the value of the first read latch BPL and the value of the sequence number register RNO for each of these four tags E1, E2, E3, E4, as well as the value of tag counter CE, the value of tag decounter DCE and the value of the bit position counter CRB are represented.

The second embodiment of the inventive method consists in carrying out a binary tree read depthwise first. In this embodiment, the binary search tree, constituted by the comprehensive description of all possible codes, is scanned depthwise. Codes are read bit by bit, until the least significant bit is found. Next, they are read in sequence, code by code, e.g. in descending order.

This method mainly comprises two loops nested in the search sequence: a loop indexed on the number of tags listed at a given time and a second loop indexed on the bit position.

Of course, the number of tags present is not known at the beginning of the read sequence and it changes as the search tree is scanned, each time at least one tag is detected at each branch of the arborescence node.

In this embodiment, the architecture of the tag, such as it has been described for the preceding embodiment, is identical on the whole, except that the tag does not comprise a tag decounter.

Also, regarding the architecture of the polling device: in this second embodiment, it is the same as that already described except that said device does not comprise a tag decounter DCE.

Given the negligible difference regarding the tag and the polling device between the two embodiments of the inventive method, their architectures will not be described again.

It should be noted that the illustrations and examples that are going to be provided later in the description presuppose that the choice of the first branch to be scanned is that of the one corresponding to a bit set to one, implying that codes are read in descending order. However, it will be understood that a different approach can be envisaged with reading codes in ascending order, both approaches leading to virtually identical read times.

Figure 9:
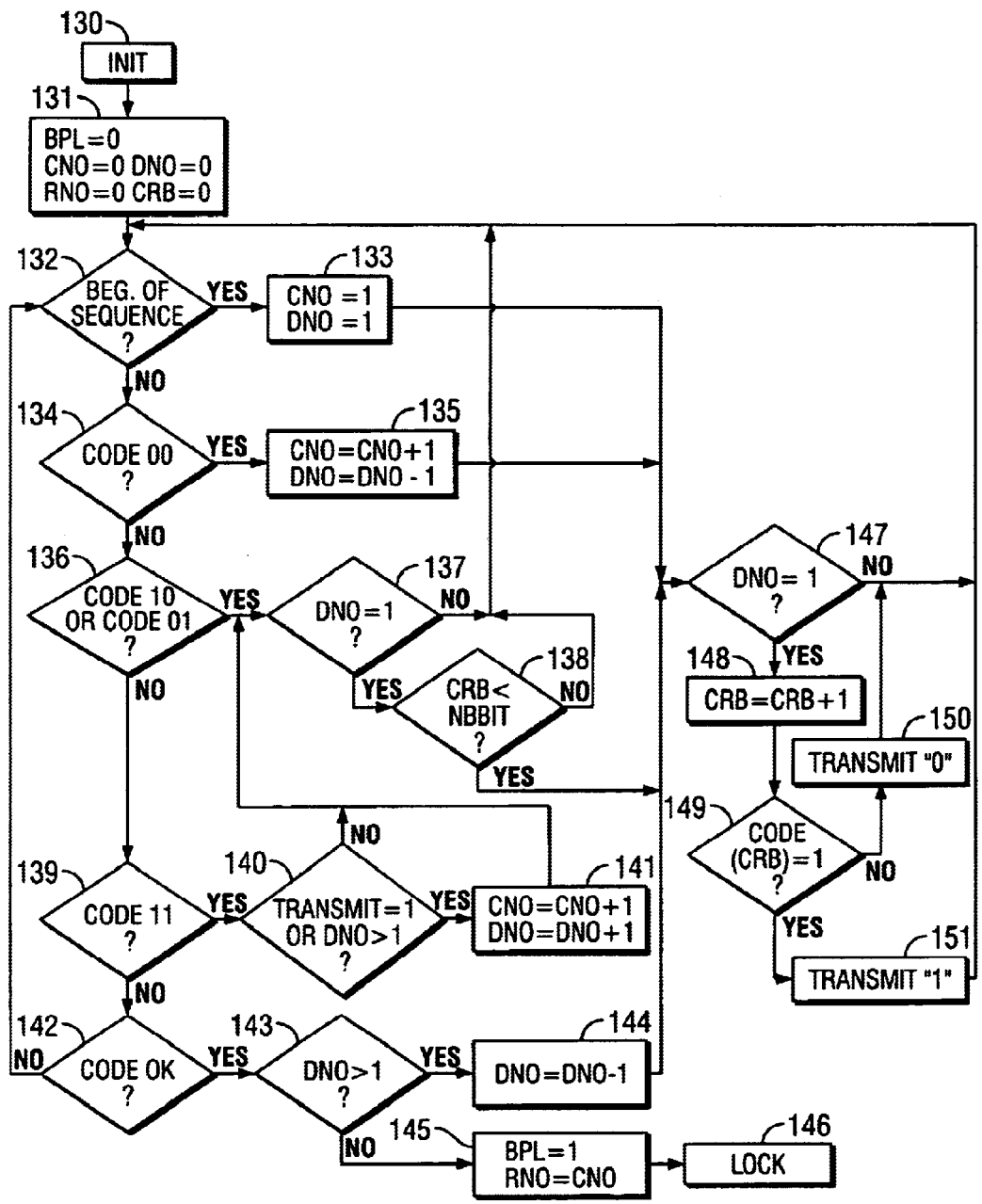
FIG. 9 represents the block diagram of the code read phase, for the tag, in the second embodiment of the invention.

In FIG. 9, the block diagram of the phase where the tag reads the codes is represented for the second embodiment of the invention.

Just like in the first embodiment of the invention, the search sequence starts with a "beginning of sequence" message and finishes with an "end of sequence message" sent by the interrogator.

In a way analogous to the method according to the first embodiment, this search sequence comprises two aspects: scanning (or reading) codes present and validating codes received.

Figure 11:
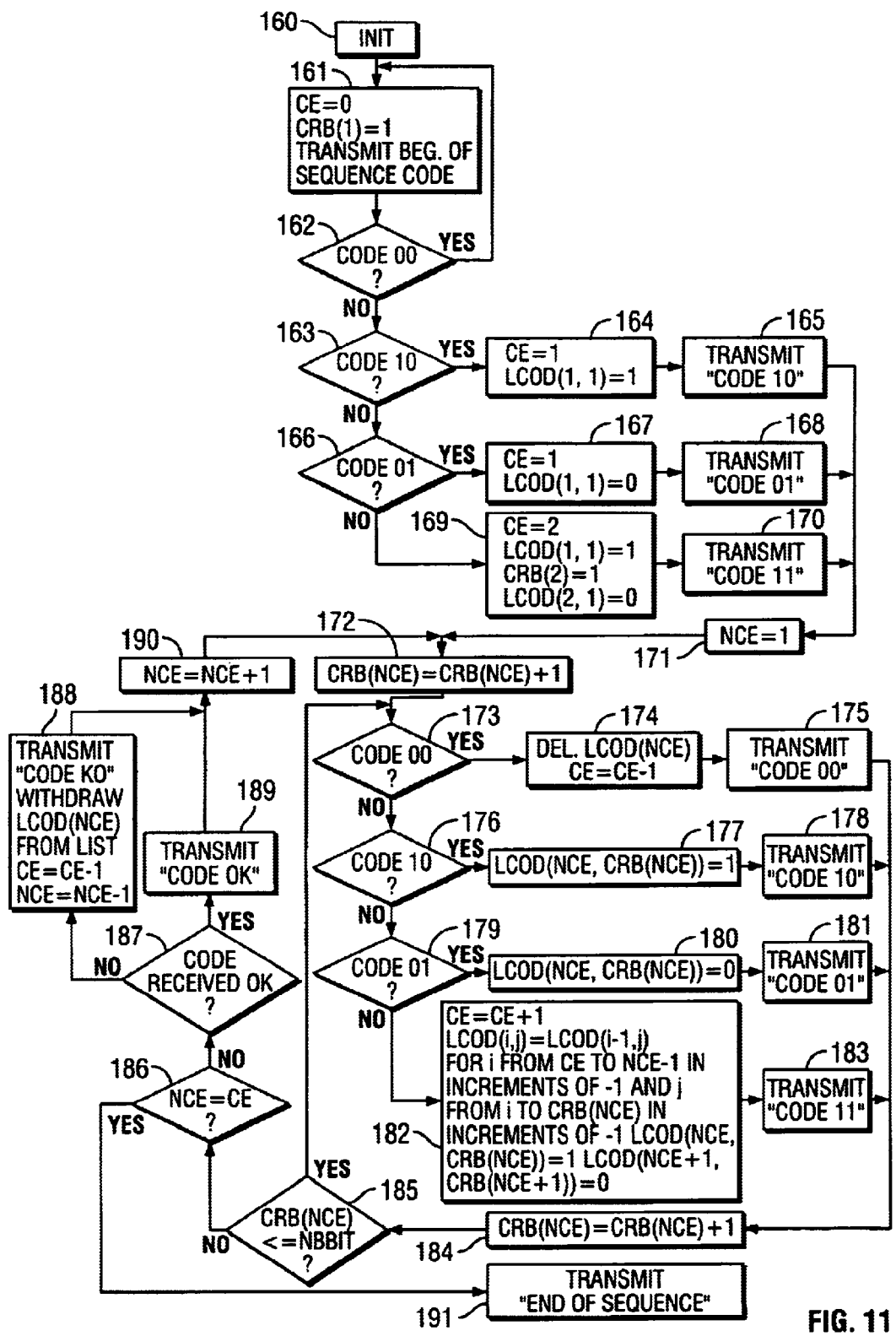
FIG. 11 represents a sample block diagram including code read and verification for the polling device in the second embodiment.

FIG. 11 represents the block diagram of the code identification and verification phases for the polling device, in accordance with the second embodiment of the invention, i.e. in the case of a depthwise read first.

This method starts with a polling device initialization step 160. It proceeds with a step 161 for setting the tag counter CE to 0, setting the bit position counter CRB to 1 and sending a beginning of sequence message.

Subsequently, a test 162 checks whether code00 has been received. Should this be the case, then the method continues at the beginning of step 161. Otherwise, the method proceeds to test 163 that checks whether it is code10: if so, the tag counter CE is set to 1 (block 164) and bit 1 of the first tag code is set to 1, LCOD (1,1)=1. The method then proceeds with a step 165 transmitting "code10", then, a step 171 setting the current tag number NCE to 1.

If in test 163, code10 is not involved, then the polling device checks during a test 166 whether it is code01. Should this be the case, then the tag counter CE is set to 1 and bit 1 of the first code is set to 0 (step 167), then code01 is transmitted in step 168; the method then proceeds to step 171, already mentioned earlier.

If in test 166, the code received is not "code01", this means that there is at least one tag with a bit set to 0 and at least one with a bit set to 1 (code 11); the list is then initialized with a tag set to 1 for the first bit and a tag set to 0 for the first bit; the tag counter CE is set to 2 and the bit position counter CRB (2) of tag 2 is set to 1. The method proceeds by transmitting "code11" (step 170) then with step 171 incrementing the current tag number NCE.

A step 172 then consists in incrementing the bit position counter CRB(NCE) of tag # NCE by 1.

Tests 173, 176 and 179, respectively identical to tests 162, 163, 166, consist in checking whether this is code00, code10 or code01. If test 173 is true, a step 174 consists in deleting from list LCOD the code of the current tag # NCE and decrementing by 1 the tag counter CE. A code 00 is transmitted next (step 175).

If test 173 is not true, a test 176 is implemented. If the answer to the latter is positive, i.e. if there is at least one tag with the current bit set to 1 and none with this bit being set to "0", then the current bit CRB of tag NCE is set to 1 in the list LCOD (block 177), then a message "code10" is transmitted (block 178).

If the answer to test 176 is negative, the method proceeds with a test 179 that consists in checking whether there is at least one tag with the current bit set to "0" and none with this bit being set to "1" (i.e. "code01"); should this be the case, the current bit CRB of tag NCE is set to "0" in the code list LCOD in step 180, then "code01" is transmitted, in 181.

If the answer to test 179 is negative, i.e. if there is at the same time at least one tag with the current bit CRB set to "1" and at least one tag with this current bit set to "0", then the tag counter CE is incremented (block 182), the current bit CRB of tag NCE is set to 1 in the list LCOD, the current bit CRB of tag NCE+1 is set to "0" in the list LCOD when the beginning of the code has been duplicated with the code of the preceding tag. Then "code11" is transmitted in step 183.

After each of steps 175, 178, 181, and 183, the method proceeds with a step 184 incrementing by 1 the bit position counter CRB of tag NCE, then with a test 185 that consists in checking whether the bit position counter CRB of tag NCE is less than the bit number of the ID code NBBIT. If so, the method continues at the beginning of step 173. If not, a test 186 consists in checking whether the tag number NCE is equal to the tag counter CE.

If this test is true, then the method is finished by transmitting an end of sequence code.

If this test is not true, then a test 187 consists in checking if the code received is "OK" (the code is OK, for instance when its checksum is correct and when its parity bits are correct). If so, "codeOK" is transmitted (block 189). If not, then "codeKO" is transmitted (block 188), tag NCE is withdrawn from the list LCOD, tag counter CE is decremented by 1 as is tag number NCE.

The method then proceeds by incrementing NCE. The method then continues with step 172.

In FIG. 9, the block diagram of the identification phase is represented at tag level, according to the second embodiment of the invention (i.e. with a depthwise search first).

The ID code read phase according to this second embodiment starts with a tag initialization step 130, then setting to 0 the first read latch BPL, the sequence number counter CNO, the sequence number register RNO, the sequence number decounter DNO and the bit position counter CRB (step 131).

The method proceeds with a test 132 that consists in checking whether this is the beginning of the sequence and, should this be the case, setting to 1 the sequence number counter CNO, as well as the sequence number decounter DNO (step 133). The method proceeds with a step 147 that will be described later.

If the answer to test 132 is negative, then a test 134 is carried out for checking whether the code received is code00. If so, the sequence number counter CNO and the sequence number decounter DNO are each decremented by 1, in step 135; then the method proceeds to step 147. If not, a test 136 is carried out for checking whether the code received is code10, or code01. Should this be the case, a test 137 checks whether the sequence number decounter DNO is 1 and, if so, a new test 138 is carried out for checking whether the bit position counter CRB is less than NBBIT. If the answer to test 137 or to test 138 is negative, then the method continues at the beginning of test 132. If the answer to test 138 is positive, then the method proceeds to step 147.

If the answer to test 136 is negative, then a test 139 checks whether the code received is code11. Should this be the case, then a test 140 checks whether "1" has been transmitted previously, or whether the sequence number decounter DNO is greater than 1. If so, the sequence number counter CNO and the sequence number decounter DNO are incremented by 1 and the method continues at the beginning of test 137. If the answer to test 140 is no, then the method continues directly with test 137.

If the result of test 139 is negative, then a test 142 checks whether a message codeOK has been received. Should this not be the case, the method continues with test 132. Otherwise, a test 143 is carried out for checking whether the sequence number decounter DNO is greater than 1: if so, DNO is decremented by 1 (step 144) and the method proceeds to step 147; if not, the first read latch BPL is set to 1 and the sequence number register RNO is set to the value of the sequence number counter CNO (step 145), then the tag is locked (step 146).

After the DNO decrement step 144, just like at the end of test 138, step 135 and step 133, the method proceeds with a test 147 that consists in checking whether the sequence number decounter DNO is 1. Should this be the case, then the bit position counter CRB is incremented by 1 (step 148) and a test 149 checks whether the code (for the current bit position counter) is 1. If so, "1" is transmitted, in step 151, then back to test 132. If not, "0" is transmitted in step 150, then back to the beginning of test 132.

Figure 10:
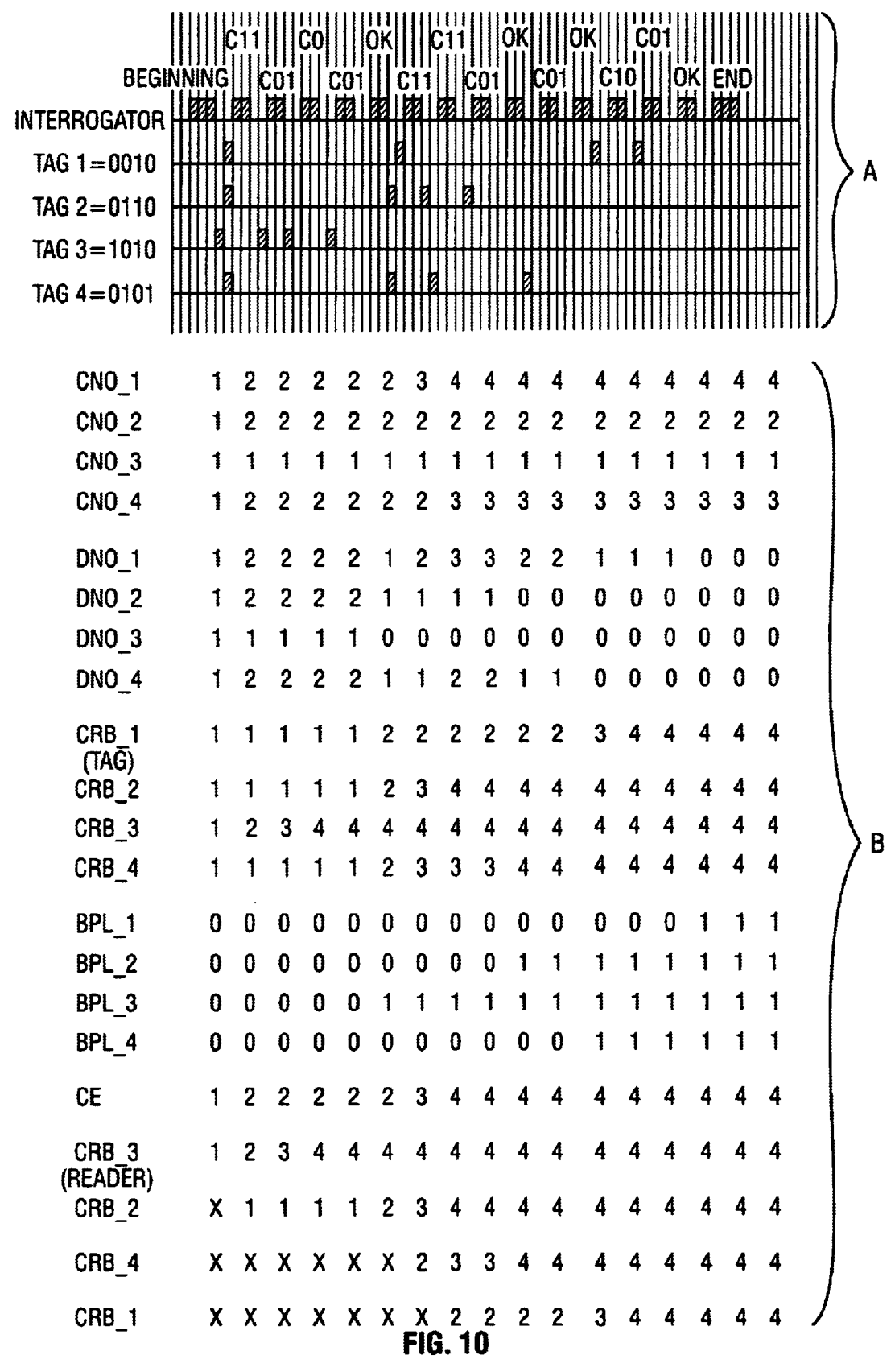

FIG. 10 shows the time chart of the search sequence for the example represented in FIG. 1 and according to the second embodiment, i.e. with a depthwise read first.

In part A, the response of each of tags 1, 2, 3, and 4 appears as the read phase goes along. As this read method consists in reading the binary tree depthwise first, it appears that the most significant bit of each tag is first of all determined then that each code is determined, one after the other. In this example, it is therefore the code of tag 3 that will be determined first, then the code of tag 2, then the code of tag 4 and finally the code of tag 1.

In part B are represented the values for the sequence number counters CNO, the sequence number decounters DNO of each tag E1, E2, E3 and E4, the value of the bit position counter CRB, as well as the value of the first read latch BPL. Also noted is the value of the tag counter CE, as well as the value of the bit position counter CRB for the polling device.

---

FIG. 5
POLLING CODE
TAG(S) WITH BIT = 0
TAG(S) WITH BIT = 1
BASIC PERIOD
FIG. 2/ FIG. 3
SEQUENCER
FIG. 4
INITIALIZE
TEST FOR PRESENCE
YES/NO
IDENTIFY AND ASSIGN SEQUENCE NUMBER
CHECK NUMBERS IN CURRENT LIST
UPDATE INFORMATION INSIDE TAGS
LIST UPDATE
TEST FOR PRESENCE
YES/NO
IDENTIFY AND ASSIGN SEQUENCE NUMBER
LIST EMPTY
YES/NO
FIG. 6A
30 INIT
32 BEGINNING OF SEQUENCE?
YES/NO
36 END OF CODE READ = LOCK
39 CODE 10 OR CODE 01?
YES/NO
48 TRANSMIT "0"
47 TRANSMIT "1"
50 TRANSMIT = 0?
YES/NO
FIG. 6B
36 END OF CODE READ
61 READ CODE OK?
YES/NO
65 TRANSMIT "1"
66 CODE READ KO?
YES/NO
70 TRANSMIT "0"
71 END OF SEQUENCE
YES/NO
72 END OF CODE VERIFICATION
FIG. 7A
80 INIT
81 BEGINNING OF SEQUENCE
85 TRANSMIT "C0DE10"
88 TRANSMIT "CODE01"
90 TRANSMIT "CODE11"
95 DEL. LCOD(NCE)
94 TRANSMIT "CODE00"
97 TRANSMIT "CODE10"
100 TRANSMIT "CODE01"
101 FOR i FROM CE TO NCE - 1 IN INCREMENTS OF −1 AND j FROM 1 TO CRB IN INCREMENTS OF −1
102 TRANSMIT "CODE 11"
106 END OF CODE READ
FIG. 7B
TRANSMIT BEGINNING
BEGINNING OF CODE VERIFICATION
CODE 00?
NO
END WITH ERROR
YES
LCOD(NCE) OK?
NO
TRANSMIT "KO"
DEL. LCOD(NCE)

-continued

```
YES
TRANSMIT "OK"
TRANSMIT "END OF SEQUENCE"
END OF SEQUENCE
FIG. 8
BEGINNING
END
INTERROGATOR
TAG
FIG. 9
130 INIT
132 BEGINNING OF SEQUENCE?
YES/NO
136 CODE 10 OR CODE 01?
YES/NO
150 TRANSMIT "0"
151 TRANSMIT "1"
140 TRANSMIT = 1
OR DNO > 1?
YES/NO
142 CODE OK?
YES/NO
146 LOCK
FIG. 10
BEGINNING
END
INTERROGATOR
TAG
(TAG)
(READER)
FIG. 11
160 INIT
161 TRANSMIT BEGINNING OF SEQUENCE CODE
165 TRANSMIT "CODE10"
168 TRANSMIT "CODE01"
170 TRANSMIT "CODE11"
188 TRANSMIT "CODEKO"
WITHDRAW LCOD(NCE) FROM LIST
189 TRANSMIT "CODEOK"
187 CODE RECEIVED OK?
YES/NO
174 DEL. LCOD(NCE)
175 TRANSMIT "CODE00"
178 TRANSMIT "CODE10"
181 TRANSMIT "CODE01"
182 WITH i FROM CE TO NCE −1 IN INCREMENTS OF −1 AND j FROM 1 TO CRB(NCE) IN INCREMENTS OF −1
183 TRANSMIT "CODE11"
191 TRANSMIT "END OF SEQUENCE"
```

What is claimed is:

1. In a system for reading a dynamic set of tags via a polling device, wherein each of said tags includes a distinct binary ID code, the tags and the polling device each comprising means for signal transmitting/receiving (1, 2, 14, 15, 16, 17), means for electronic sequencing (5, 18), and means for storing (13, 22), said polling device further comprising:

a first tag counter (19) to provide a counting of a total number of tags of the dynamic set of tags present during a read sequence;

a first bit position counter (21) to provide a weight corresponding to a bit position of the distinct binary ID code;

a pointer (23) pointing to a distinct binary ID code in a list of distinct binary ID codes provided in the polling device; and said tag further comprising:

a second bit position counter (8) to provide a weight corresponding to a bit position of the distinct binary ID code;

a sequence number counter (10) to provide an incrementation upon an occurrence of a new higher code indicating the presence of a tag of the dynamic set of tags;

a sequence number decounter (12) to provide a decrementation during a position search sequence of the bits of the distinct binary ID code;

a sequence number register (11) to provide storage of a sequence number of the tag of the dynamic set of tags as calculated during said read sequence;

a second tag counter (6) to provide a counting of a total number of tags of the dynamic set of tags present during said read sequence; and a first read latch (9) to provide a tag lock upon completion of a determination of the distinct binary ID code of a tag.

2. The system according to claim 1, further comprising a tag decounter (7, 20) to provide a partially identified code identification, wherein said identification determines a bit position.

3. The system according to claim 1, wherein said first tag counter (19) and said second tag counter (6) are capable of counting all tags present.

4. The system according to claim 1, wherein at least one tag further comprises:

a bit position counter;

a storage register for the list of codes partially identified; and a pointer for pointing to said code list, wherein said pointing provides the tag a code identification of other tags through the transmissions of the polling device.

* * * * *